United States Patent [19]

Tomita et al.

[11] Patent Number: 4,677,487
[45] Date of Patent: Jun. 30, 1987

[54] DIGITAL NOISE REDUCING APPARATUS FOR A VIDEO SIGNAL PROCESSING RECORDING REPRODUCING APPARATUS

[75] Inventors: Masao Tomita, Neyagawa; Akio Hashima, Tsuzuki, both of Japan

[73] Assignee: Matsushita Electric Industrial Co., Ltd., Osaka, Japan

[21] Appl. No.: 662,454

[22] Filed: Oct. 17, 1984

[30] Foreign Application Priority Data

Dec. 16, 1983 [JP] Japan .................................. 58-238138

[51] Int. Cl.⁴ ........................ H04N 5/211; H04N 5/94
[52] U.S. Cl. .................................... 358/167; 358/336; 358/340
[58] Field of Search ................. 358/167, 166, 905, 36, 358/39, 314, 327, 328, 336, 340, 37

[56] References Cited

U.S. PATENT DOCUMENTS 4,291,333 9/1981 Warnock ............................. 358/167
4,302,768 11/1981 Kamura ............................. 358/167
4,398,219 8/1983 Yasuda ............................. 358/167

FOREIGN PATENT DOCUMENTS 211885 12/1982 Japan .................................. 358/167

Primary Examiner—Tommy P. Chin
Attorney, Agent, or Firm—Wenderoth, Lind & Ponack

[57] ABSTRACT

A digital noise reducing apparatus improves the signal to noise ratio (S/N) of a luminance signal of a video signal reproduced from a recording medium. This apparatus includes: an analog to digital (A/D) converting circuit for converting the luminance signal into a digital luminance signal; a digital delay circuit for delaying the digital luminance signal by one horizontal scanning period (1H); a first calculating circuit for calculating the difference between the digital luminance signal and the delayed digital luminance signal; a limiting circuit for limiting the amplitude of an output signal of the first calculating circuit, and a second calculating circuit for subtracting a signal output which is from the limiting circuit from the digital luminance signal. The apparatus operates to reduce noise at the line offset frequency of the luminance signal.

5 Claims, 4 Drawing Figures

FIG. 1.
(PRIOR ART)
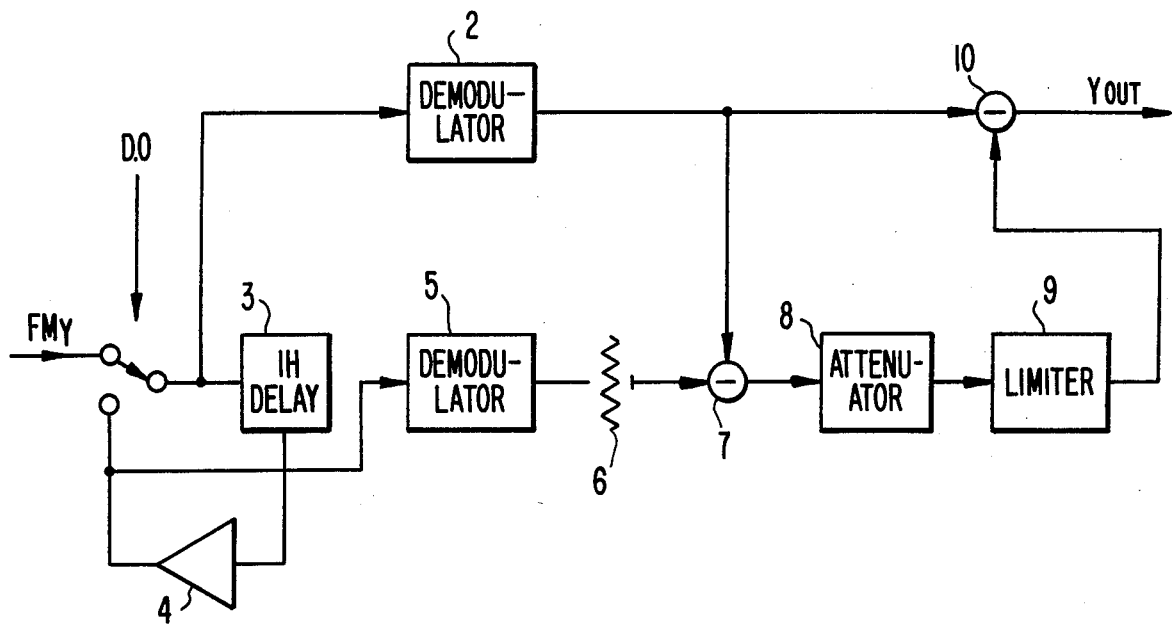
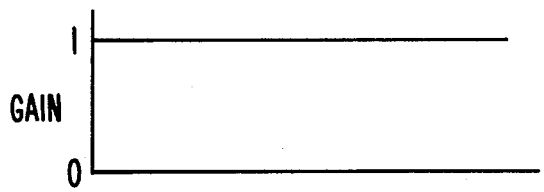
FIG. 2(a).
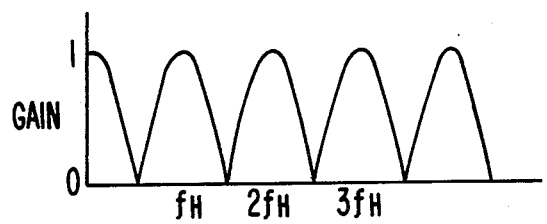
FIG. 2(b).
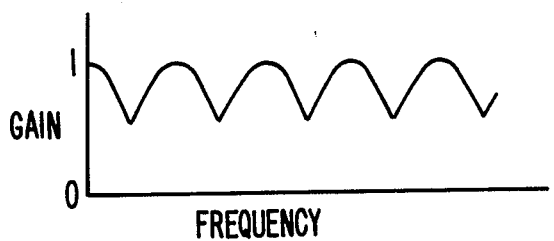
FIG. 2(c).
(PRIOR ART)

DIGITAL NOISE REDUCING APPARATUS FOR A VIDEO SIGNAL PROCESSING RECORDING REPRODUCING APPARATUS

BACKGROUND OF THE INVENTION

1. Field of the Invention

This invention relates to a video signal processing apparatus used for a video signal recording/reproducing apparatus such as a video tape recorder and a video disc player for performing line noise cancellation of video signals so as to thereby improve the signal to noise ratio (S/N) of the video signals.

2. Description of the Prior Art

In video signal recording/reproducing apparatus such as video tape recorders (VTR) and video disc players, the luminance signal is recorded on a recording medium with its frequency modulated. The luminance signal, when reproduced from the recording medium, is frequency-demodulated so as to produce the original luminance signal. Since the S/N ratio of the recording medium-reproducing head system is not always sufficient, the S/N ratio of the reproduced luminance signal is also often insufficient, and as a result, noise is perceived on the reproduced picture. For improving the S/N ratio of the luminance signal, the so-called line noise canceller as shown in FIG. 1 has been used. Basically, it eliminates unnecessary spectrum signals by means of a Y-type comb filter so as to improve the S/N ratio, making use of line correlation of the luminance signal. When this is done, a proper measure is provided for preventing the vertical resolution of the picture from being deteriorated. The frequency-modulated luminance signal (FM$_Y$) is fed to one input terminal of a switch 1. The common terminal of the switch 1 is connected to a demodulator 2 and to a 1H (one horizontal synchronizing period) delay line 3. The output of the 1H delay line 3 is connected to the other input terminal of the switch 1 and to a demodulator 5 through an amplifier 4. The output of the demodulator 5 is applied to a subtractor (or difference calculator) 7 through an amplitude regulator 6. The 7. The output signal of the subtractor 7 is applied to a subtractor (or difference calculator) 10 through an attenuator 8 and a limiter 9. The output of the demodulator 2 is also applied to the subtractor 10. At the output of the subtractor 10 is obtained a luminance signal (Y$_{out}$) having an improved S/N ratio.

In FIG. 1, the switch 1, 1H delay line 3 and amplifier 4 constitute a dropout compensator. In a normal state in which no dropout is contained in the luminance signal FM$_Y$, the switch 1 is positioned as shown in FIG. 1, and the FM$_Y$ is passed to the next stage as is. If a dropout occurs, the switch 1 is shifted to the other state by a signal called D.O produced by a dropout detector (not shown), so that the FM$_Y$ is replaced by the luminance signal inputted 1H before, which contains no dropout. The insertion loss by the 1H delay line is compensated for by the amplifier 4.

The dropout-compensated FM$_Y$ signal is demodulated by the demodulator 2 and applied to the subtractor 7 as the luminance signal of the base band. The FM$_Y$ signal, which passed through the 1H delay line 3 and amplifier 4, is demodulated by the demodulator 5 and turned into the luminance signal of the base band, which is delayed by 1H, and then applied to the subtractor 7 through the amplitude regulator 6. The subtractor 7 forms a C-type comb filter against the demodulated luminance signal. When the output of the subtractor 7 is low (i.e.—the correlation of the luminance signal is high), or within the limited level of the limiter 9, it is applied to the substractor 10 as is. When the output of the subtractor 7 is high (i.e.—the correlation of the luminance signal is low), its amplitude is clipped at a fixed amplitude by the limiter 9 and applied to the subtractor 10. Therefore, the output of the subtractor 10 becomes a signal passed through a Y-type comb filter in an area where correlation of the luminance signal is high, so that the S/N ratio is improved with noise components reduced.

The Y-type comb filter is not formed in an area where correlation of the luminance signal is low, because the amplitude is limited by the limiter 9 and the input signal is outputted as is. Consequently, vertical resolution is not deteriorated. The attenuator 8 is for adjusting the input level of the subtractor 10 so as to be close to the output level of the demodulator 2, because the amplitude of the C-type comb filter (which is the output of the subtractor 7) is double that of the input level.

FIGS. 2(a)-(c) are provided for explaining the operation of the construction of FIG. 1 in terms of its frequency characteristics. FIG. 2(a) shows the frequency characteristic when the correlation of the input luminance signal is low. It shows that the input luminance signal is outputted as is. Although the S/N ratio is not improved, the vertical resolution of the reproduced picture is not deteriorated. FIG. 2(b) shows the frequency characteristic when the correlation of the input luminance signal is high. This is what is called the characteristic of the Y-type comb filter which provides a gain of 1 with respect to a frequency which is an integer multiple higher than the horizontal scanning frequency ($f_H$) and provides a gain of 0 with respect to frequency ($\frac{1}{2}$ line offset) which is an odd number of times higher than $\frac{1}{2}$ $f_H$. In this case, noise around the $\frac{1}{2}$ line offset frequency are eliminated, so that the S/N ratio is improved. When there is no correlation in the vertical direction of the picture like this, the S/N ratio can be improved without deteriorating the vertical resolution, because the comb filter is formed only in an area where the correlation appears.

However, the above described conventional line noise canceller has some defects. First, since the passband is not of the base band starting from 0 Hz and allows only an RF signal to pass because the 1H delay line is a glass delay line, only a frequency-modulated luminance signal passes. Thus, two or more frequency demodulators are required because the output signal of the delay line and the input signal must be demodulated respectively. Second, since the glass delay line has an insertion loss, the amplifier 4 is Third, since the insertion loss of the glass delay line tends to vary widely, the amplitude regulator 6 is required to form the comb filter. Fourth, the frequency characteristics of the passband of the glass delay fluctuates greatly, and the fluctuation deteriorates the frequency characteristics of the final luminance signal. Due to these reasons, the attenuation rate of the attenuator 8 is normally set low so that the frequency characteristics of the glass delay line will not seriously affect the output. Theoretically, if the attenuation rate is halved, the complete characteristic of the comb filter shown in FIG. 2(b) can be obtained. Actually, however, since the attenuation rate is quartered so that the output will not be affected by the fluctuation of the frequency characteristic of the 1H delay line 3, the comb filter characteristic becomes as shown in FIG. 2(c), and the complete comb filter characteristics cannot be obtained. This not only reduces the improvement of the S/N ratio, but also cannot sufficiently eliminate the cross modulation components of a chroma signal whose spectrum exists at the position of ½ line offset.

Furthermore, although not shown in the drawings, since the delay time of the glass delay line also varies widely, the delay time must be adjusted.

As described above, since the conventional line noise canceller uses the glass delay line, various measures are required to cover its characteristics, resulting in a complicated circuit configuration.

SUMMARY OF THE INVENTION

Therefore, an object of the present invention is to provide a video signal processing apparatus for obtaining a reproduced video signal having a significantly improved signal quality.

Another object of the present invention is to provide a video signal processing apparatus for effectively improving the S/N of the reproduced video signal by using line correlation of the video signal.

Still another object of the present invention is to provide a video signal processing apparatus for performing line noise cancellation by using a digital signal processing, which allow a reduction in the circuit size and allows a reliable circuit operation.

These objects can be achieved basically by a video signal processing apparatus comprising: an analog to digital converting means for converting an input video signal to a digital signal; a digital delay means for delaying the digitized input video signal by a specified period; a first calculating means which produces a difference between a digital luminance signal obtained by digitizing an input luminance signal and a digital luminance signal delayed by the specified period by the digital delay means; a limiting means which attenuates the output of the first calculating means by a specified rate and limits the amplitude thereof; and a second calculating means which subtracts the output of the limiting means from the digital luminance signal, thereby reducing noise around ½ offset of the input luminance signal. The specified delay period (preferably, 1H) may be effected by a digital memory, so that no insertion loss and bandwidth reducing problems occur. As a result, not only circuit construction can be simplified, but also miniaturization via semiconductor circuit integration techniques becomes easy, enabling a compact and low cost video signal processing apparatus.

BRIEF DESCRIPTION OF THE DRAWINGS

FIG. 1 is a block diagram of a typical conventional line noise canceller.

FIGS. 2(a)-(c) illustrate frequency characteristics used to explain the operation of this invention.

DESCRIPTION OF THE PREFERRED EMBODIMENTS

Figure 3:
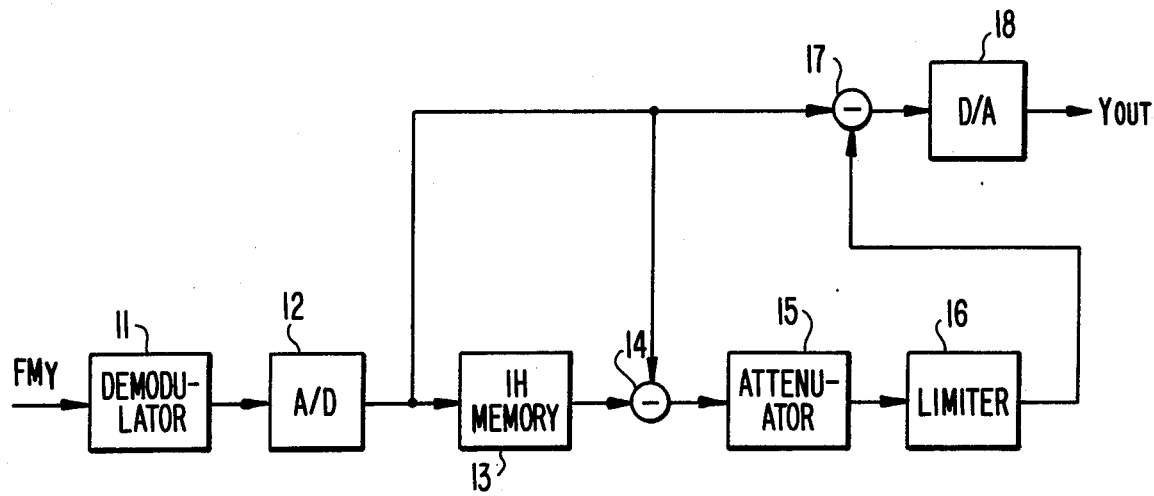
FIG. 3 is a schematic block diagram of a main part of one embodiment of a video signal processing apparatus according to this invention.

FIG. 3 shows a schematic block diagram of a line noise canceller of the luminance signal which is an embodiment of the present invention. A frequency-modulated luminance signal ($FM_Y$) reproduced from a recording medium passes through a demodulator 11 and is converted to a digital signal by an A/D converter 12. The digital signal is input to subtractors (or difference calculation circuits) 14 and 17, and a 1H memory 13. The output of the 1H memory 13 is fed to another input of the subtractor 14. The output of the subtractor 14 is input to the subtractor 17 through an attenuator 15 and a limiter 16. The output of the subtractor 17 is input to a D/A converter 18, from which a processed luminance signal ($Y_{out}$) is outputted.

The luminance signal $FM_Y$ is demodulated by the demodulator 11, and converted to a digital signal by the A/D converter 12. The digitized luminance signal is delayed by 1H by the 1H memory 13. Since the 1H memory 13 is a digital memory such as a shift register or a random access memory (RAM), it can be an ideal delay element which is not theoretically accompanied by an attenuation of the amplitude of the signal to be delayed, or fluctuations of the frequency characteristics and time errors, and has no irregularity. The 1H memory 13 and the substractor 14 form a C-type comb filter. The output of the C-type comb filter is reduced in level by the attenuator 15 so that the amplitude is halved. This can be easily achieved by shifting the digital signal by 1 bit to lower it. Since the 1H memory 13 is not accompanied by fluctuations of the frequency characteristics, the attenuation rate of the attenuator 15 can be set to just ½. The output of the attenuator 15 is limited in amplitude by the limiter 16, in such a way that only the lower bits of the digital signal are passed to the next stage. The output of the limiter 16 is supplied to another input of the subtractor 17.

The output signal of the subtractor 17 shows such a characteristic as having passed through a Y-type comb filter when the output signal level of the subtractor 14 is small. On the other hand, when the output signal level of the subtractor 14 is large, the output signal of the A/D converter 12 appears as is at the output of the subtractor 17. Therefore, the reconverted analog signal at the output of the D/A converter 18 becomes as shown in FIGS. 2(a) or (b). Therefore, the S/N ratio is improved by the Y-type comb filter in an area where correlation of the input luminance signal is high, whereas the input luminance signal is outputted as is in an area where correlation of the input luminance signal is low, thus satisfying the function as a line noise canceller such that the picture is not deteriorated in the vertical direction.

Some features of the embodiment in FIG. 3 will be described below when compared with the conventional example in FIG. 1. First, since the digitized base-band luminance signal can be delayed by 1H, only one demodulator 11 may need be provided by demodulating the frequency-modulated luminance signal. Second, the amplitude compensating amplifier is not required because the 1H memory 13 does not cause an insertion loss. In addition, since the amplitude does not vary at all, a level controller is not required before the subtractor 14. Third, since the frequency characteristics of the 1H memory 13 do not fluctuate, the attenuation rate of the attenuator 15 can be set to just ½. Accordingly, it is possible to adjust the characteristics of the comb filter so that the minimum gain may become 0 as shown in FIG. 2(b). Putting together the first and second features and the fact that processing is all done digitally, it is possible to make the apparatus compact and decrease the cost due to the simplification of the digital processing circuit.

The third feature is related to the performance of the apparatus. Considering that the S/N ratio can be significantly improved as compared to the conventional analog type of line noise canceller and especially that the cross modulation component of the chroma signal is of ½ line offset and exists at the valley of the Y-type comb filter characteristics, there is a considerable difference in the reduction of the cross modulation components.

Figure 4:
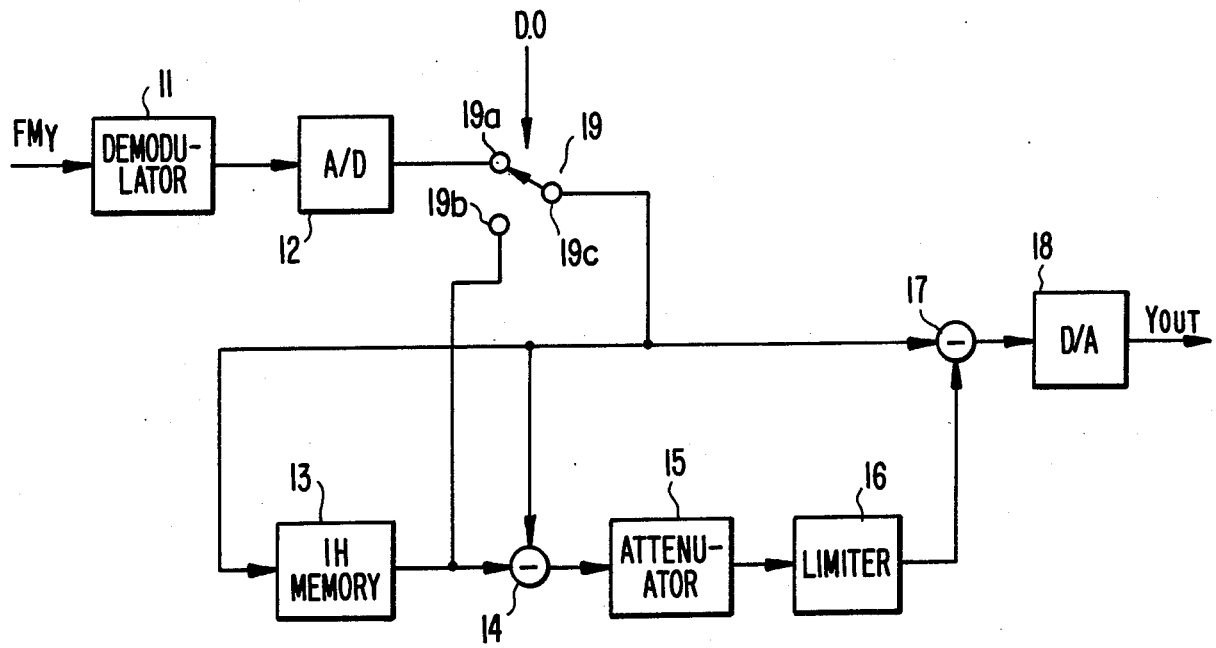
FIG. 4 is a schematic block diagram of a main part of another embodiment of a video signal processing apparatus according to this invention.

FIG. 4 shows a block diagram of another embodiment of the present invention. This embodiment has a dropout compensating function in addition to the line noise cancelling function in FIG. 3. The 1H memory 13 is commonly used for both functions. The digital luminance signal outputted from the A/D converter 12 is supplied to an input terminal 19a of an electronic switch 19. The other input terminal 19b of the switch 19 is connected to the output terminal of the 1H memory 13 which delays the signal at a common terminal 19c of the switch 19 by 1H. When no dropout occurs, the digital luminance signal from the A/D converter 12 appears at the common terminal 19c of the switch 19 as is, and it is supplied to the line noise canceller. When a dropout occurs, the switch 19 is changed over by a D.O signal produced by a dropout detector (not shown in the figure), so that the 1H delayed signal from the 1H memory 13 is supplied to the line noise canceller.

In this case, the dropout compensated signal is the digitized luminance signal of the base band. Unlike the conventional example shown in FIG. 1, level adjustments and time adjustments are not required, and phase noise is not caused when changing over the switch 19.

As is clear from the above description, this invention not only eliminates the defects of the conventionally used glass delay line by using a digitial 1H memory to delay by one horizontal scanning period, a digital signal obtained by converting the luminance signal, but also carries out the function of line noise concellation and dropout compensation without fine adjustment and with a simple construction. Especially, combined with the points that only one demodulator is necessary, and that an insertion loss compensating amplifier is not necessary, and that level adjustments and time adjustments of the comb filter are not necessary, and that miniaturization is easy (because all signals are processed digitally), this invention is very effective in realizing a compact and low cost video signal (luminance signal) processing apparatus for a video signal recording/reproducing apparatus. Furthermore, since this invention enables ideal comb filter characteristics, which could not be realized by the conventional line noise canceller, it significantly improves the S/N ratio and eliminates the cross modulation components of the chroma signal.

What is claimed is:
1. A video signal processing apparatus comprising:
   an analog to digital converting means for converting an input luminance signal to a digital signal;
   a single digital delaying means for delaying said digital signal by a predetermined period;
   a switch means having an output terminal connected to an input terminal of said digital delaying means, and first and second input terminals respectively connected to an output terminal of said analog to digital converting means and output terminal of said switch means being normally connected to said first input terminal and to said second input terminal in response to an externally provided signal indicating an occurrance of a dropout in said input luminance signal;
   a first calculating means for producing a first difference signal between input and output digital signals of said digital delaying means;
   an attenuating means for attenuating, by a predetermined ratio, said first difference signal from said first calculating means so as to produce an attenuated first calculating means so as to produce an attenuated first difference signal;
   a limiting means for limiting within a predetermined level the amplitude of said attenuated first difference signal so as to produce an attenuated and limited first difference signal;
   a second calculating means for producing a second difference signal between said input digital signal of said digital delaying means and said attenuated and limited first difference signal; and
   a digitial to analog converting means for converting said second difference signal from said second calculating means, so as to thereby obtain a dropout compensated luminance signal when said dropout occurs and a noise cancelled luminance signal in the absence of the occurrence of said dropout.
2. A video signal processing apparatus according to claim 1, wherein said predetermined period is one horizontal synchronizing period.
3. A video signal processing apparatus according to claim 1, wherein said digital delaying means comprises a digital memory.
4. A video signal processing apparatus according to claim 1, wherein each of said first and second calculating means comprises a digital subtractor.
5. A video signal processing apparatus according to claim 1, wherein said predetermined attenuation ratio is 1/2.

* * * * *